US007043741B2

(12) United States Patent
Yo et al.

(10) Patent No.: US 7,043,741 B2
(45) Date of Patent: May 9, 2006

(54) ADJUSTMENT APPARATUS FOR A SPINDLE MOTOR OF AN OPTICAL DISK DRIVE

(75) Inventors: Yu-Shi Yo, Ping Tung (TW); Ching-Nien Yu, Yi Lan (TW)

(73) Assignee: Asustek Computer Inc., Taipei (TW)

( * ) Notice: Subject to any disclaimer, the term of this patent is extended or adjusted under 35 U.S.C. 154(b) by 171 days.

(21) Appl. No.: 10/705,229

(22) Filed: Nov. 12, 2003

(65) Prior Publication Data

US 2004/0148621 A1 Jul. 29, 2004

(30) Foreign Application Priority Data

Nov. 12, 2002 (TW) .............................. 91133150 A

(51) Int. Cl.
*G11B 17/028* (2006.01)

(52) U.S. Cl. ...................................................... 720/697

(58) Field of Classification Search ................ 720/697; 356/139.1, 138, 153, 155
See application file for complete search history.

(56) References Cited

U.S. PATENT DOCUMENTS

| | | | | |
|---|---|---|---|---|
| 3,876,309 | A * | 4/1975 | Zicaro et al. | 356/153 |
| 4,214,186 | A * | 7/1980 | Kreutzer | 315/102 |
| 4,422,787 | A * | 12/1983 | Guthrie | 400/621 |
| 5,508,609 | A * | 4/1996 | Parkinson et al. | 324/207.25 |
| 6,055,122 | A * | 4/2000 | Sugawara et al. | 360/78.11 |
| 6,449,224 | B1 * | 9/2002 | Lee et al. | 369/44.14 |
| 6,570,828 | B1 * | 5/2003 | Kikuchi et al. | 369/44.32 |
| 6,621,770 | B1 * | 9/2003 | Kato | 369/44.14 |

* cited by examiner

*Primary Examiner*—William Korzuch
*Assistant Examiner*—Matthew Kayrish
(74) *Attorney, Agent, or Firm*—Rabin & Berdo, P.C.

(57) ABSTRACT

An adjustment apparatus for regulating the inclination angle of a spindle motor of an optical disk drive is disclosed. The spindle motor is mounted on a driving circuit board which is mounted in a traverse module. The adjustment apparatus comprises an optic axis regulating tool for containing the traverse module and regulating the inclination angle of the spindle motor. The top surface of the optic axis regulating tool has an opening to expose the spindle motor and a guide rail of the traverse module. A standard plate is placed against on the guide rail, wherein the upper surface of the standard plate is in parallel with the guide rail. A comparable turning wheel is placed to cover the spindle motor, wherein the upper surface of the comparable turning wheel is in parallel with the rotation plane of the spindle motor and a plurality of turbine-like blades are set at the edge of the comparable turning wheel. A gaseous spray nozzle is mounted on the top surface of the optic axis regulating tool and sprays gas out toward the turbine-like blades to drive rotation of the comparable turning wheel and to simultaneously drive rotation of the spindle motor. An autocollimator emits light beams respectively onto the standard plate and the comparable turning wheel and detects the reflective light beams thereof to show the light spots on the screen. An operator can regulate the inclination angle of the spindle motor based on the light spots on the screen.

10 Claims, 7 Drawing Sheets

ADJUSTMENT APPARATUS FOR A SPINDLE MOTOR OF AN OPTICAL DISK DRIVE

FIELD OF THE INVENTION

The present invention relates to an adjustment apparatus for a spindle motor of an optical disk drive and, more specifically, to a design for adjusting the inclination angle of the spindle motor of the optical disk drive by using an autocollimator and an optic axis regulating tool, without using electricity to drive the spindle motor.

BACKGROUND OF THE INVENTION

With rapid development of personal computers, computer peripheral products evolve and change promptly. The computer peripheral products such as hard disk drives, optical disk drives, scanners and printers, etc. are the necessary equipment for modern offices, and have spread into households due to reduction of price. The optical disk drive is now an extremely convenient and popularized storage medium because an optical disk has an extremely large storage capacity and the stored data thereof may include audio and video formats and can be preserved over a long period of time. In particular, since a new generation of Digital Versatile Discs (DVDs) owns a high capacity up to 17 GB and the output characteristic of higher quality, the optical disk drives is even more broadly applied.

Please refer to FIG. 1, which is a schematic perspective diagram of a traverse module 5 and related elements in an optical disk drive. The traverse module 5 includes a spindle motor 10 and a disk loader 12 disposed on the top of the spindle motor 10. The disk loader 12 is used to rotating an optical disk which is placed thereon. Moreover, an optical pick-up head 14 is mounted on a sliding base 16 and is driven by a sled motor to move forward and backward along a guide rail 17 such that the optical pick-up head 14 can horizontally move in parallel with the disk face of the optical disk. A voice coil motor (not shown) set on the sliding base 16 is used to adjust the vertical location of the optical pick-up head 14 to focus the laser exactly on the optical disk. Thus, when the optical disk is placed on the disk loader 12, the location of the optical pick-up head 14 can be controlled and adjusted by the sled motor and the voice coil motor so that the optical pick-up head 14 can read the data on the optical disk.

In order for the optical pick-up head 14 to precisely read the data on the optical disk while moving along the guide rail 17, the optical disk placed on the disk loader 12 is required to keep in parallel with the guide rail 17, that is, the surface of the optical disk should maintain vertical to the laser emitted from the optical pick-up head 14. To reach such requirement, in the process of assembling the traverse module 5 of the optical disk drive, the operator should precisely adjust the angle and position of the spindle motor 10 so as to have the upper surface of the disk loader 12 in parallel with the guide rail 17. Therefore, when the optical disk is placed on the disk loader 12, the optical disk will run parallel with the guide rail 17 so as to facilitate reading the data on the optical disk precisely for the optical pick-up head 14.

In general, referring to FIG. 2, which is a schematic perspective diagram of the structures of the spindle motor and the bus mounted on a driving circuit board, since the spindle motor 10 is fabricated on a driving circuit board 18, during assembling, the driving circuit board 18 is firmly locked on the plate of the traverse module 5 so as to fix the spindle motor 10 thereon. Therefore, the operator in the production line can regulate adjustable screws 18l and 182 on the driving circuit board 18 to adjust the angle and position of the spindle motor 10. As shown in FIG. 2, the two adjustable screws 181 and 182 are respectively located on the X axis and the Y axis and are used to adjust the inclination angle of the driving circuit board 18 respectively at the X axis and the Y axis so as to keep the upper surface of the spindle motor 10 parallel to the plane of the guide rail 17. A bus 183 is combined to the side edge of the driving circuit board 18 and can be connected to the power supply of the optical disk drive so as to provide the electricity power required for rotation of the spindle motor 10.

Referring to FIG. 3, in order to precisely regulate the inclination angle of the spindle motor 10, in the current production line of the optical disk drive, an autocollimator 20 and an optic axis regulating tool 22 are used to carry out adjustment in the angle of the spindle motor 10. In the axial regulation procedure, the traverse module 5 is firstly put into the optic axis regulating tool 22. As shown in FIG. 3, the top surface of the optic axis regulating tool 22 has a rectangular opening to just expose the elements of the traverse module 5 such as the guide rail 17, the sliding base 16, the optical pick-up head 14, the spindle motor 10 and the disk loader 12.

Then, as shown in FIG. 4, a rectangular standard plate 24 is placed by the operator on the guide rail 17 to cover the sliding base 16 and the optical pick-up head 14, and the disk loader 12 is covered with a circular comparable turning wheel 26. The upper surface of the standard plate 24 is in parallel with the guide rail 17 and the upper surface of the comparable turning wheel 26 is parallel to that of the disk loader 12.

Since the standard plate 24 and the comparable turning wheel 26 both have a smooth metallic surface, two reflective light beams can be produced and detected by the autocollimator 20 after the light beams emitted from the autocollimator 20 irradiate the upper surfaces of the standard plate 24 and the comparable turning wheel 26. FIG. 5A shows the result of the two reflective light beams detected by the autocollimator 20 on the screen 28, wherein the light spot a located at the center of the screen 28 represents the position of the reflective light beam of the standard plate 24, and another light spot b represents the position of the reflective light beam of the comparable turning wheel 26.

Subsequently, the operator presses the buttons on an operation panel 221 of the optic axis regulating tool 22 (as shown in FIG. 3) to have the spindle motor 10 driven by electricity so as to rotate the disk loader 12. At this time, the reflective light beam produced by the light projection of the autocollimator 20 onto the comparable turning wheel 26 forms a halo c on the screen 28, as shown in FIG. 5B. The halo c is produced due to the slight inclination of the comparable turning wheel 26, that is, the upper surface of the comparable turning wheel 26 is not precisely vertical to the projecting light beam. Hence, when the spindle motor 10 is rotating, the light beam reflected from the upper surface of the comparable turning wheel 26 forms the halo c on the screen 28.

In order to have the disk loader 12 in parallel with the guide rail 17, the following regulation is performed by the operator: turning rotation nodes 222 on the two sides of the optic axis regulating tool 22 to respectively regulate the adjustable screws 181 and 182 on the driving circuit board 18 of the traverse module 5 so as to have the halo c approach the light spot a produced by the reflective beam of the standard plate 24 as possible as it can. Thus, the upper surface of the disk loader 12 can be parallel to the guide rail 17 and the optical pick-up head 14 can then move in parallel with the optical disk and read the data on the optical disk precisely.

Since electricity is required in the above-mentioned adjustment to drive the rotation of the spindle motor 10, the bus 183 of the driving circuit board 18 have to firstly be inserted to a power supply before the traverse module 5 is placed in the optic axis regulating tool 22 so as to provide the electrical power required for the spindle motor 10. Furthermore, after the regulation procedure, it is required to pull out the bus 183 from the socket of power source so as to perform subsequent assembling and test procedures. Apparently, repetition of inserting and pulling the bus 183 prolongs the period of the entire regulation procedure and thus the throughput of the regulation and assembling lines is greatly reduced.

SUMMARY OF THE INVENTION

The objective of the present invention is to provide an adjustment apparatus for carrying out the axial regulation procedure of a spindle motor of an optical disk drive, without using electricity to drive the spindle motor.

A method for regulating the inclination angle of a spindle motor of an optical disk drive is disclosed in this invention, wherein the spindle motor is mounted on a driving circuit board which is mounted in a traverse module and the traverse module has a guide rail for an optical pick-up head to slide thereon. This method comprises the following steps. Firstly, the d traverse module is placed in an optic axis regulating tool, wherein the top surface of the optic axis regulating tool has an opening to expose the spindle motor and the guide rail. Then, a standard plate is placed in the opening and against on the guide rail, wherein the upper surface of the standard plate is in parallel with the guide rail. Subsequently, a comparable turning wheel is placed in the opening and the spindle motor is covered with the comparable turning wheel, wherein the upper surface of the comparable turning wheel is in parallel with the rotation plane of the spindle motor and a plurality of turbine-like blades are set at the edge of the comparable turning wheel. Afterwards, a gaseous spray nozzle is used to spray gas out toward the turbine-like blades of the comparable turning wheel to drive rotation of the comparable turning wheel and to simultaneously drive rotation of the spindle motor. The inclination of the upper surface of the comparable turning wheel in relation with the standard plate is detected. Moreover, the angle of the driving circuit board is regulated to have the upper surface of the comparable turning wheel in parallel with that of the standard plate such that the rotation plane of the spindle motor is parallel to the plane of the guide rail.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
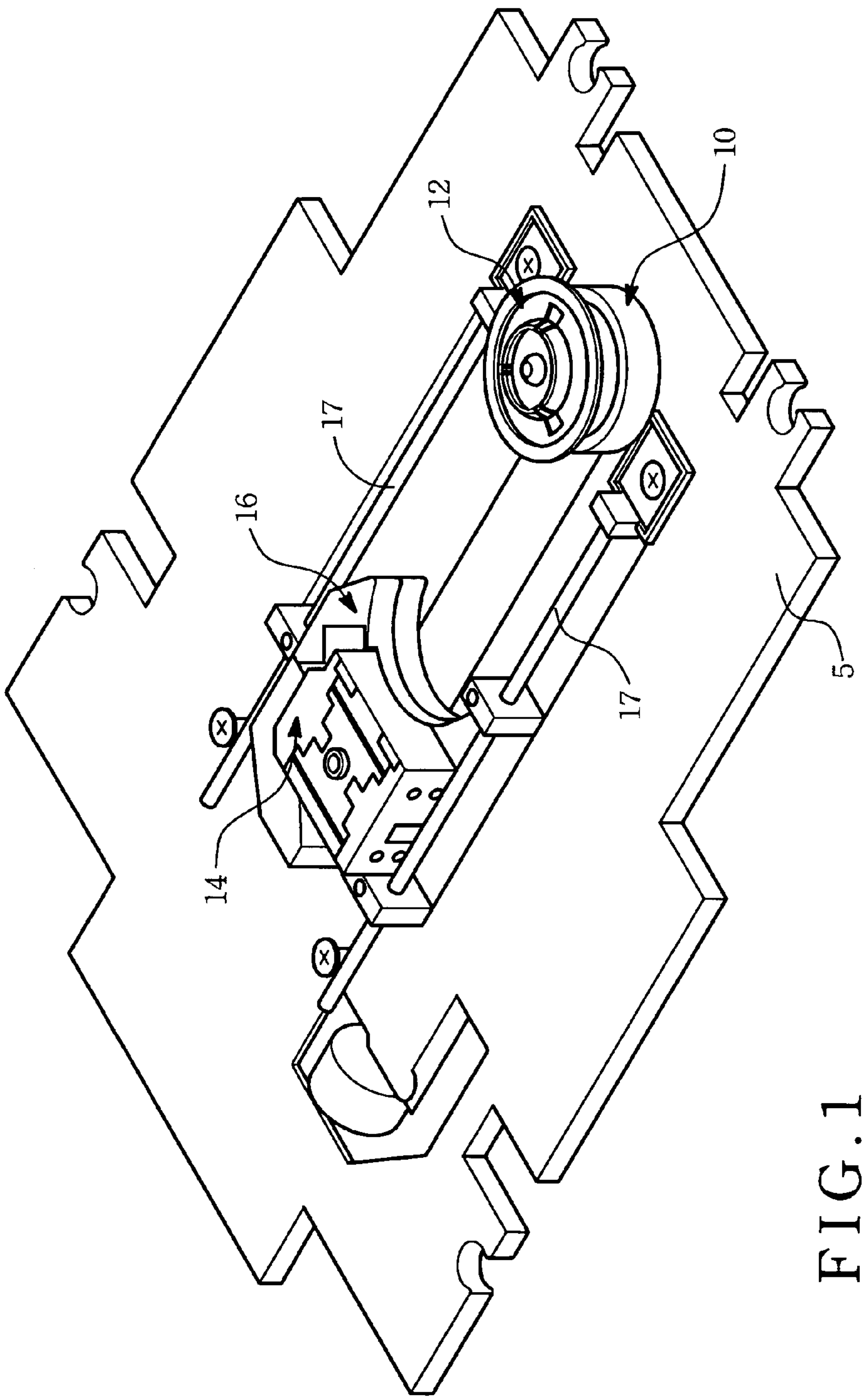
FIG. 1 is a schematic perspective diagram of a traverse module and related elements in an optical disk drive.
Figure 2:
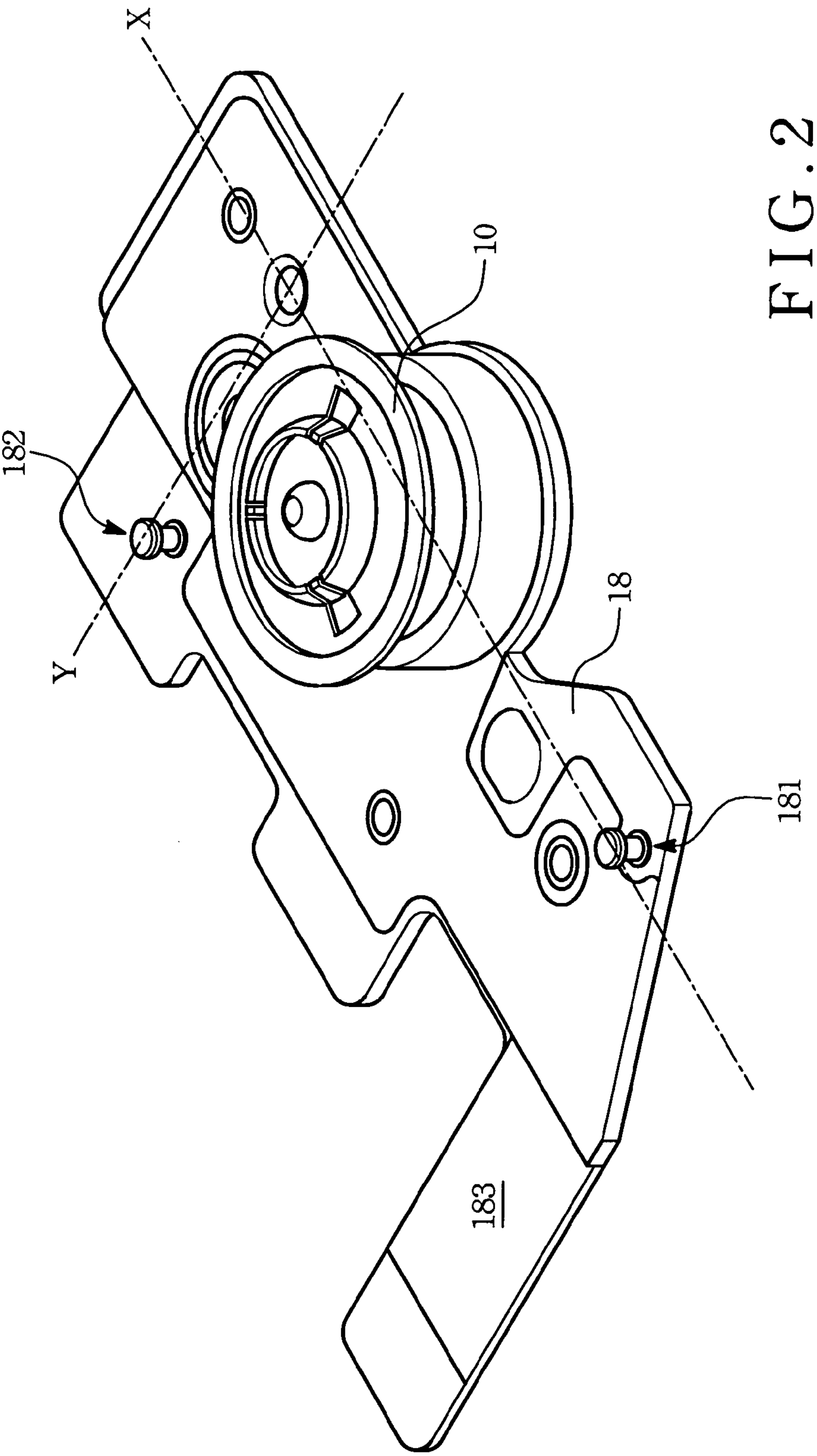
FIG. 2 is a schematic perspective diagram of the structures of a spindle motor and a bus mounted on a driving circuit board.
Figure 3:
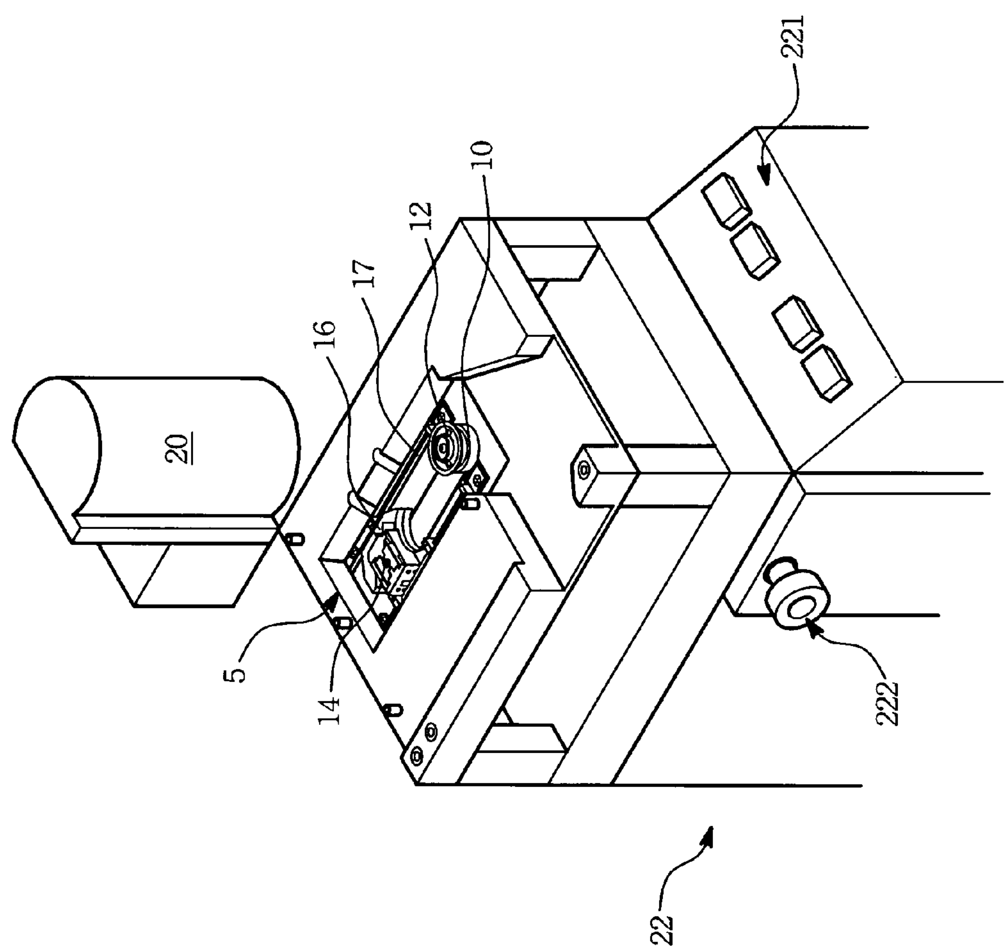
FIG. 3 shows an autocollimator and an optic axis regulating tool which are used to carry out adjustment in the inclination angle of the spindle motor in the prior art.
Figure 4:
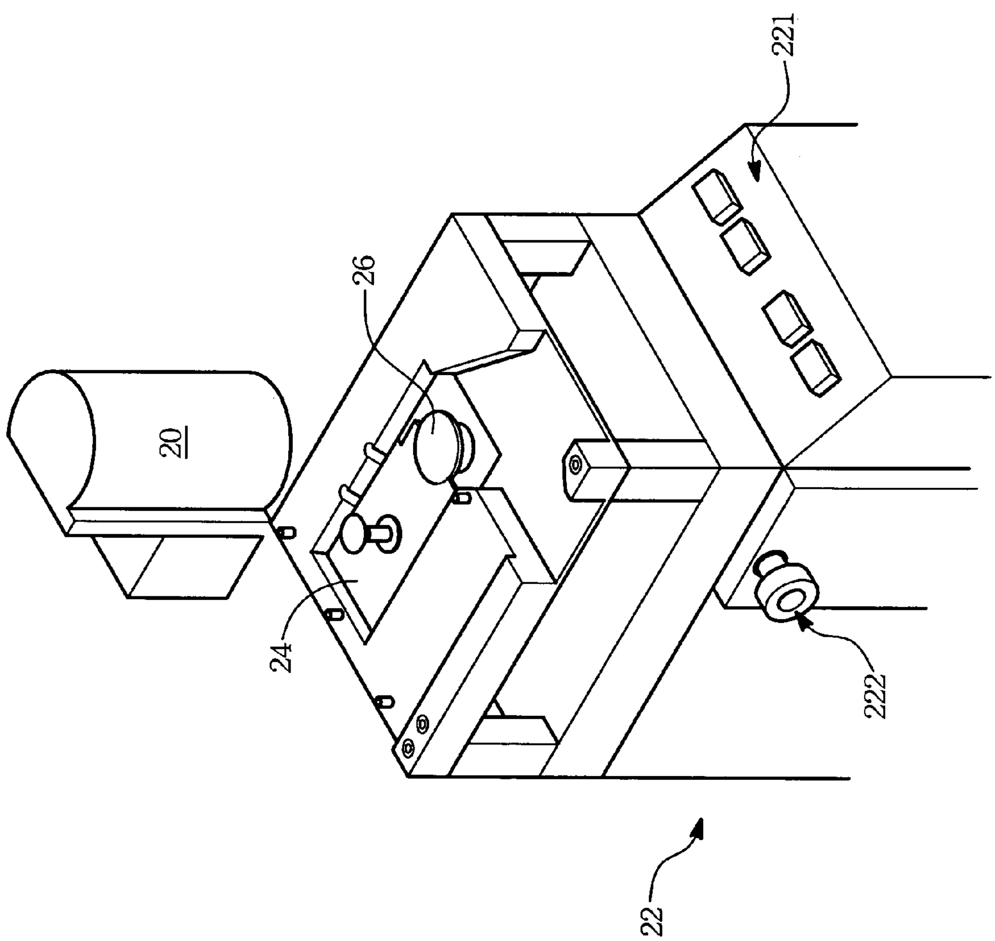
FIG. 4 shows the regulation step of using the autocollimator and the optic axis regulating tool in combination with a standard plate and a comparable turning wheel in the prior art.
Figure 5A:
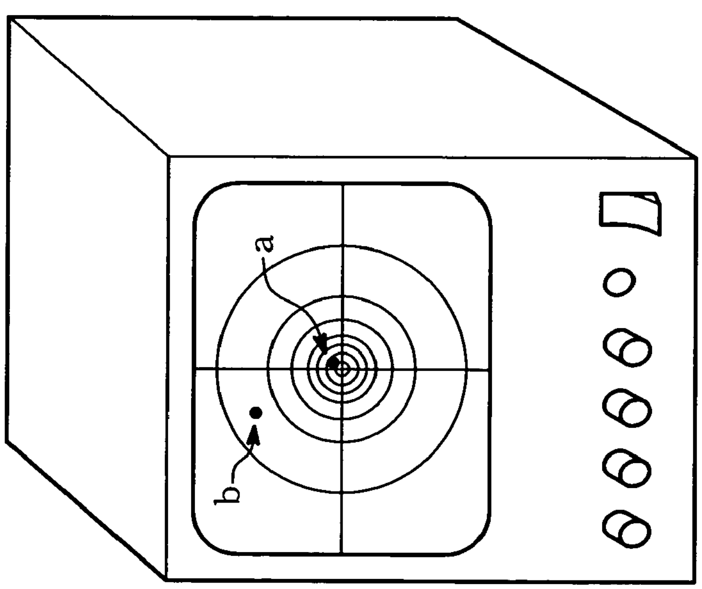
FIGS. 5A and 5B show the light spots on the screen after the reflective light beams are detected by the autocollimator.
Figure 5B:
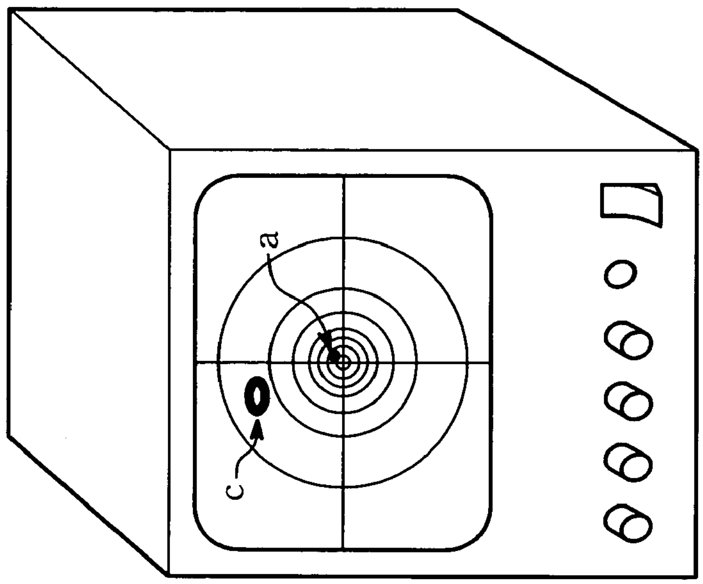
Figure 6:
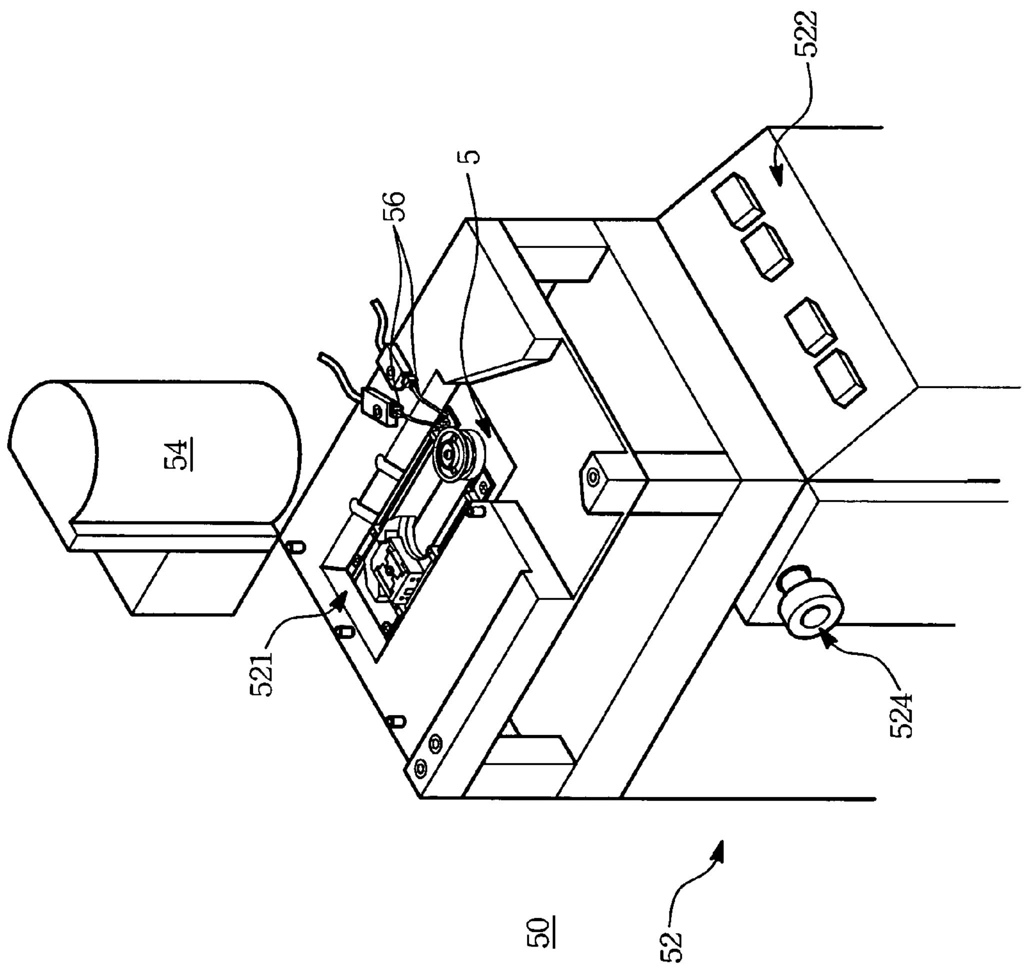
FIG. 6 is a schematic diagram illustrating an adjustment apparatus of this invention.

Please refer to FIG. 6, which is a schematic diagram of an adjustment apparatus 50 of this invention. This adjustment apparatus 50 can be used to regulate the inclination angle of the spindle motor of the optical disk drive. The spindle motor 10 (as shown in FIG. 2) is mounted on the driving circuit board 18 which is mounted in the traverse module 5. Two adjustable screws 181 and 182 are disposed on the driving circuit board 18 and respectively located on the X axis and the Y axis, as shown in FIG. 2. When the driving circuit board 18 is installed on the traverse module 5, the inclination angle of the driving circuit board 18 along the X axis and the Y axis is adjusted by rotating the two adjustable screws 181 and 182 and the inclination angle and direction of the spindle motor 10 are then regulated.

As shown in FIG. 6, the adjustment apparatus 50 mainly includes an optic axis regulating tool 52 and an autocollimator 54 which is above the optic axis regulating tool 52, wherein the optic axis regulating tool 52 can contain the traverse module 5 and adjust the two adjustable screws 181 and 182 of the driving circuit board 18 to regulate the inclination angle of the spindle motor 10. The top surface of the optic axis regulating tool 52 has a rectangular opening 521 which just exposes the elements of the traverse module 5 such as the guide rail 17, the sliding base 16, the optical pick-up head 14, the spindle motor 10 and the disk loader 12, when the traverse module 5 is put into the optic axis regulating tool 52.

Two sets of gaseous spray nozzles 56 are mounted on the top surface of the optic axis regulating tool 52, adjacent to the disk loader 12 of the traverse module 5. The gaseous spray nozzles 56 extend and protrude from the opening 521. Moreover, the gaseous spray nozzles 56 are connected to a gas pump (not shown) through gas transporting ducts so as to spray gas out with the operation of the gas pump.

A control panel 522 is set on the front of the optic axis regulating tool 52 for the operator to control the operation of the optic axis regulating tool 52 and the autocollimator 54 through pressing the buttons on the control panel 522 so as to regulate the inclination angle of the spindle motor 10. A rotation node 524 is respectively set on the two sides of the optic axis regulating tool 52. By turning the two rotation nodes 524, the optic axis regulating tool 52 can rotate the two adjustable screws 118and 182 on the driving circuit board 18 so as to regulate the inclination angle of the driving circuit board 18.

Figure 7:
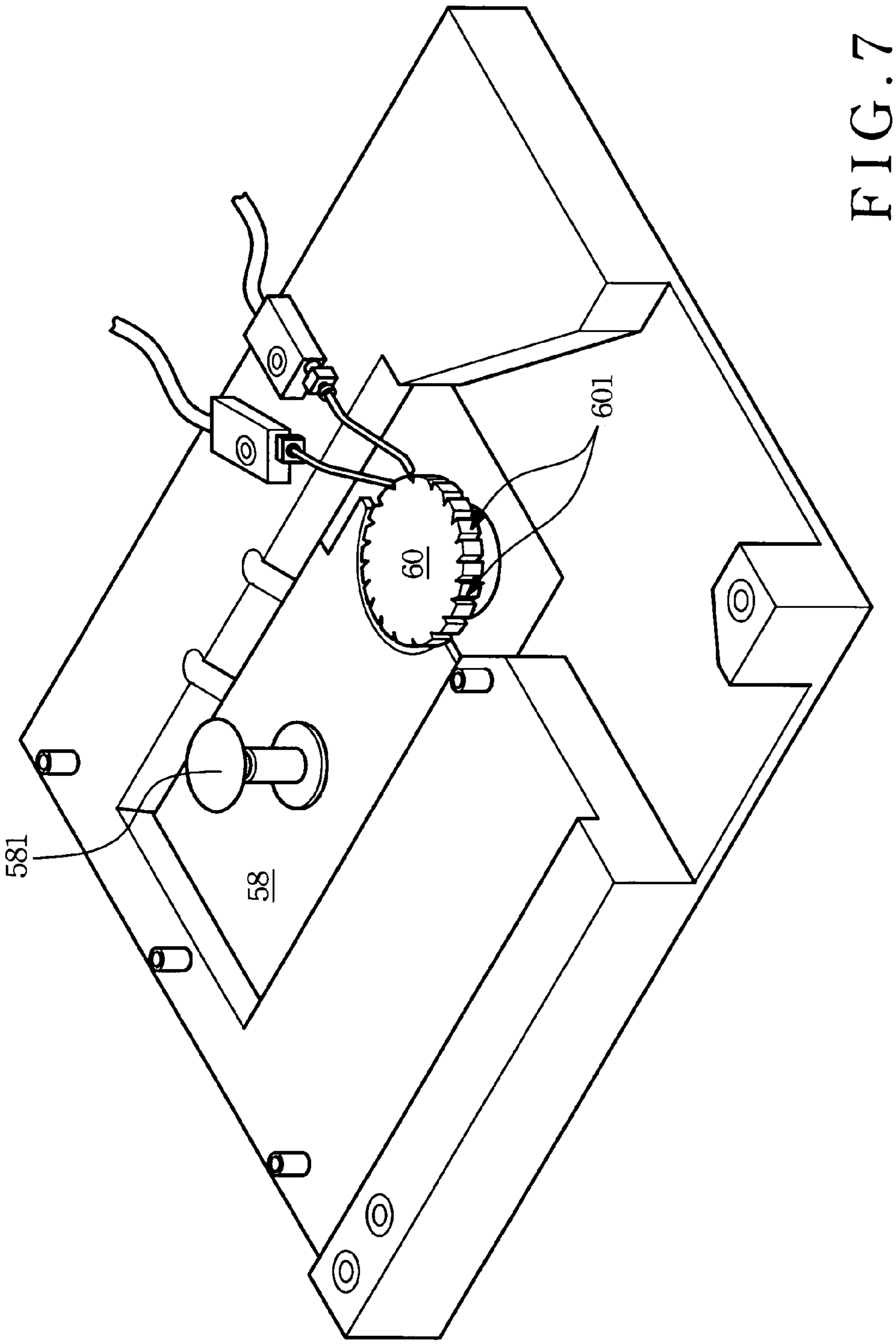
FIG. 7 shows the gaseous spray nozzles with turbine-like blades driving rotation of the comparable turning wheel in this invention.

Referring to FIG. 7, the adjustment apparatus 50 further includes a standard plate 58 and a comparable turning wheel 60, wherein the standard plate 58 is a rectangular metallic plate structure to be placed in the opening 521 of the optic axis regulating tool 52 to cover the sliding base 16, the optical pick-up head 14 and the guide rail 17. Since the lower surface of the standard plate 58 directly leans against onto the guide rail 17, the upper surface of the standard plate 58 is parallel to the guide rail 17. A handle 581 is mounted in the middle of the upper surface of the standard plate 58 for the operator to take the standard plate 58 so as to facilitate the axial adjustment procedure.

The comparable turning wheel 60 is a metallic disc structure and has a plurality of turbine-like blades 601 at the edge thereof. The lower surface of the comparable turning wheel 60 has a ring groove to cover the top surface of the disk loader 12 such that the upper surface of the comparable turning wheel 60 is in parallel with the rotating plane of the disk loader 12. In other words, when the spindle motor 10 is rotating, the upper surface of the comparable turning wheel 60 is in parallel with the rotating plane of the spindle motor 10.

After the standard plate 58 and the comparable turning wheel 60 are respectively placed on the guide rail 17 and the disk loader 12 by the operator, the buttons on the control panel 522 are pressed to operate the gas pump such that the gaseous spray nozzles 56 on the top surface of the optic axis regulating tool 52can spray gas out. Because the gaseous spray nozzles 56 face the edge of the comparable turning wheel 60, the gas is sprayed out toward the turbine-like blades 601 to drive rotation of the comparable turning wheel 60, which simultaneously drives rotation of the disk loader 12 and the spindle motor 10 thereunder.

After the light beams emitted from the autocollimator 54 respectively irradiate the metallic surfaces of the standard plate 58 and the comparable turning wheel 60, two reflective light beams can be produced and detected by the autocollimator 54. At this time, as above-mentioned, the operator can turn the rotation nodes on the two sides of the optic axis regulating tool 52 based on the light spots shown on the screen to regulate the two adjustable screws 181 and 182 on the driving circuit board 18 and to control the inclination angle of the driving circuit board 18. Since the spindle motor 10 is mounted on the driving circuit board 18, the inclination angles of the spindle motor 10, the disk loader 12 and the comparable turning wheel 60 are simultaneously adjusted in the process of regulating the angle of the driving circuit board 18. Hence, the operator can control the rotation plane of the disk loader 12 in parallel with the plane of the guide rail 17 as possible as he can so as to have the movement route of the sliding base 16 and the optical pick-up head 14 in parallel with the surface of the optical disk such that the optical pick-up head 14 can precisely focus on the optical disk.

In comparison with the regulating manner of the conventional optic axis regulating tool, this invention has considerable advantages. Since the gaseous spray nozzles are employed in this invention to drive the rotation of the comparable turning wheel, it is not necessary for the operator to insert the bus on the driving circuit board to the power supply during the axial regulating procedure of the spindle motor to drive the rotation of the spindle motor. Therefore, it can greatly reduce the wasted time for the operator to insert and pull the bus and thus can increase the efficiency of the entire axial regulating procedure and can further enhance the assembling throughput of optical disk drives. Furthermore, since it need not consider the issues of driving the spindle motor with the electrical power, this invention provides the axial regulating procedure with even more flexibility of test.

As is understood by a person skilled in the art, the foregoing preferred embodiment of the present invention is illustrated of the present invention rather than limiting of the present invention. For instance, the quantity and allocation of the gaseous spray nozzles in the above embodiment are employed to merely ensure smooth rotation of the comparable turning wheel. It is intended to cover various modifications and similar arrangements included within the spirit and scope of the appended claims, the scope of which should be accorded the broadest interpretation so as to encompass all such modifications and similar structure.

What is claimed:

1. An adjustment apparatus for regulating the inclination angle of a spindle motor of an optical disk drive, wherein said spindle motor is mounted on a driving circuit board which is mounted in a traverse module and has adjustable screws for regulating the inclination angle of said driving circuit board and said spindle motor; said adjustment apparatus comprising:

an optic axis regulating tool for containing said traverse module and regulating said adjustable screws of said driving circuit board, wherein the top surface of said optic axis regulating tool has an opening to expose said spindle motor and a guide rail of said traverse module;

a standard plate, placed in said opening and against on said guide rail, wherein the upper surface of said standard plate is in parallel with said guide rail;

a comparable turning wheel, placed in said opening and covering said spindle motor, wherein the upper surface of said comparable turning wheel is in parallel with the rotation plane of said spindle motor and a plurality of turbine-like blades are set at the edge of said comparable turning wheel;

a gaseous spray nozzle, mounted on the top surface of said optic axis regulating tool and facing the edge of said comparable turning wheel and spraying gas out toward said turbine-like blades to drive rotation of said comparable turning wheel and to simultaneously drive rotation of said spindle motor; and an autocollimator, emitting light beams respectively onto said standard plate and said comparable turning wheel and detecting the reflective light beams thereof to decide the inclination of said comparable turning wheel in relation with said standard plate;

wherein an operator can regulate said adjustable screws on said driving circuit board through said optic axis regulating tool, based on the detecting results of said autocollimator so as to regulate the inclination angle of said spindle motor.

2. The adjustment apparatus of claim 1, wherein a disk loader is disposed on the upper surface of said spindle motor and the upper surface of said disk loader is covered with said comparable turning wheel.

3. The adjustment apparatus of claim 1, wherein said driving circuit board has two of said adjustable screws thereon respectively for regulating the inclination angle of said spindle motor at the X axis and the Y axis thereof.

4. The adjustment apparatus of claim 3, wherein a rotation node is respectively set at the two sides of said optic axis regulating tool for regulating said adjustable screws on said driving circuit board.

5. A method for regulating the inclination angle of a spindle motor of an optical disk drive, wherein said spindle motor is mounted on a driving circuit board which is mounted in a traverse module and said traverse module has a guide rail for an optical pick-up head to slide thereon; said method comprising:

placing said traverse module in an optic axis regulating tool, wherein the top surface of said optic axis regulating tool has an opening to expose said spindle motor and said guide rail;

placing a standard plate in said opening and against on said guide rail, wherein the upper surface of said standard plate is in parallel with said guide rail;

placing a comparable turning wheel in said opening and covering said spindle motor with said comparable turning wheel, wherein the upper surface of said comparable turning wheel is in parallel with the rotation plane of said spindle motor and a plurality of turbine-like blades are set at the edge of said comparable turning wheel;

spraying gas out toward said turbine-like blades of said comparable turning wheel with a gaseous spray nozzle to drive rotation of said comparable turning wheel and to simultaneously drive rotation of said spindle motor;

detecting the inclination of the upper surface of said comparable turning wheel in relation with said standard plate; and regulating the angle of said driving circuit board to have the upper surface of said comparable turning wheel in parallel with that of said standard plate such that the rotation plane of said spindle motor is parallel to the plane of said guide rail.

6. The method of claim 5, wherein said driving circuit board has two adjustable screws thereon respectively for regulating the inclination angle of said spindle motor at the X axis and the Y axis thereof.

7. The method of claim 5, wherein a rotation node is respectively set at the two sides of said optic axis regulating tool for regulating said adjustable screws on said driving circuit board.

8. The method of claim 5, wherein in the step of detecting the inclination of the upper surface of said comparable turning wheel in relation with said standard plate, an autocollimator is used to emit light beams respectively onto said standard plate and said comparable turning wheel and to detect the reflective light beams thereof so as to indicate the inclination of said comparable turning wheel in relation with said standard plate.

9. An adjustable apparatus for regulating the inclination angle of a spindle motor of an optical disk drive, wherein said spindle motor is mounted on a driving circuit bound which is mounted in a traverse module and has adjustable screws for regulating the inclination angle of said driving circuit board and said spindle motor; said adjustable apparatus comprising:

an optic axis regulating tool for containing said traverse module and regulating said adjustable screws of said driving circuit board, wherein the top surface of said optic axis regulating tool has an opening to expose said spindle motor and a guide rail of traverse module;

a standard plate, placed in said opening and against on said guide rail, wherein the upper surface of said standard plate is in parallel with said guide rail;

a comparable turning wheel, place in said opening and covering said spindle motor, wherein the upper surface of said comparable turning wheel is in parallel with the rotation plane of said spindle motor; and an autocollimator, emitting light beams respectively onto said standard plate and said comparable turning wheel and detecting the reflective light beams thereof to decide the inclination of said comparable turning wheel in relation with said standard plate;

said adjustable apparatus characterized by pneumatically driving rotation of said comparable turning wheel and simultaneously driving rotation of said spindle motor such that an operator can regulate the inclination angle of said spindle motor through said optic axis regulating tool, based on the detecting results of said autocollimator.

10. The adjustment apparatus of claim 9, wherein a gaseous spray nozzle is mounted on the top surface of said optic axis regulating tool and sprays gas out toward the edge of said comparable turning wheel to drive rotation of said comparable turning wheel and to simultaneously drive rotation of said spindle motor.

* * * * *